Jan. 18, 1966     D. C. OLSON     3,229,537
REMOTE CONTROL ACTUATOR DEVICE
Filed June 22, 1962     3 Sheets-Sheet 1
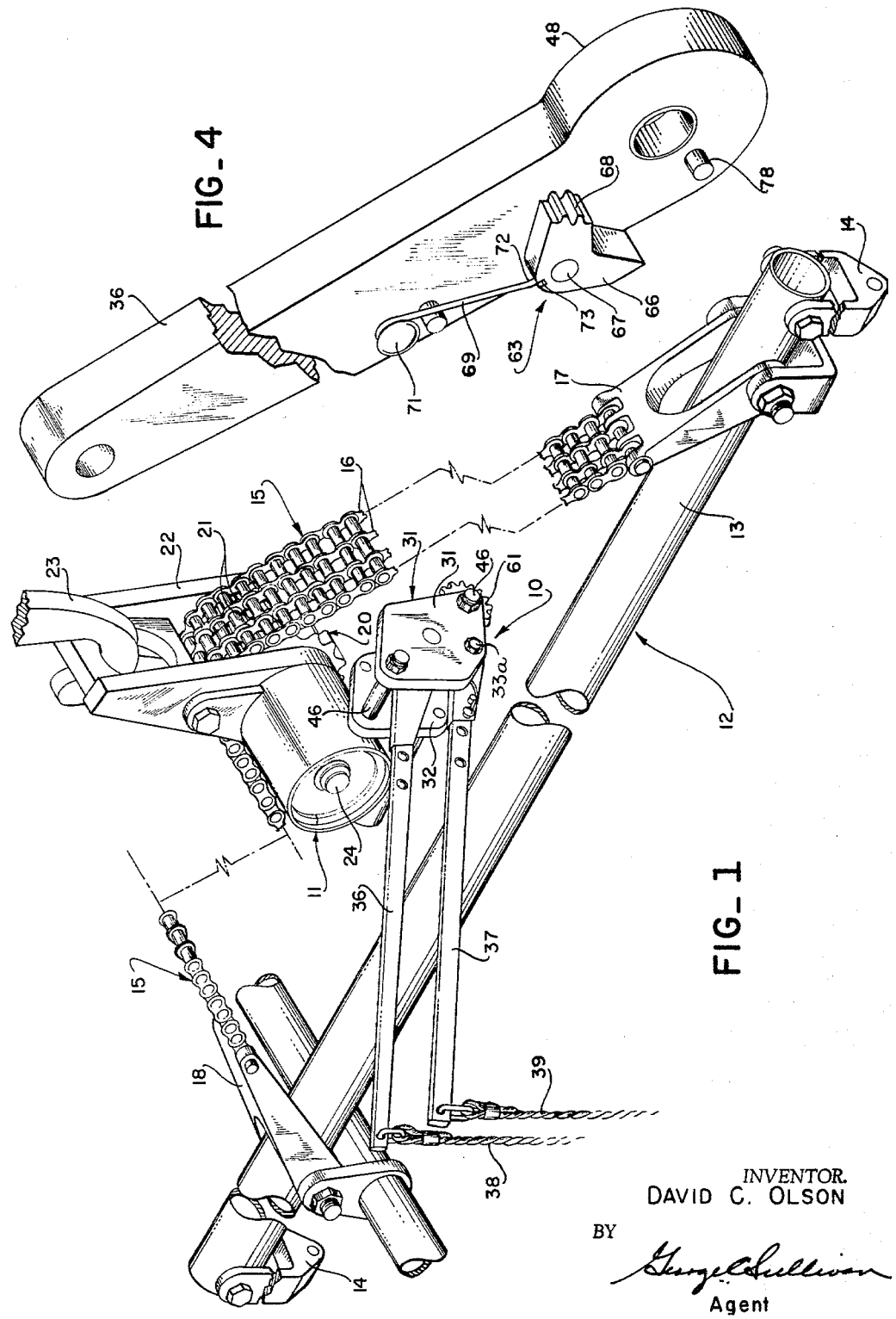
INVENTOR.
DAVID C. OLSON
BY
*George C. Sullivan*
Agent

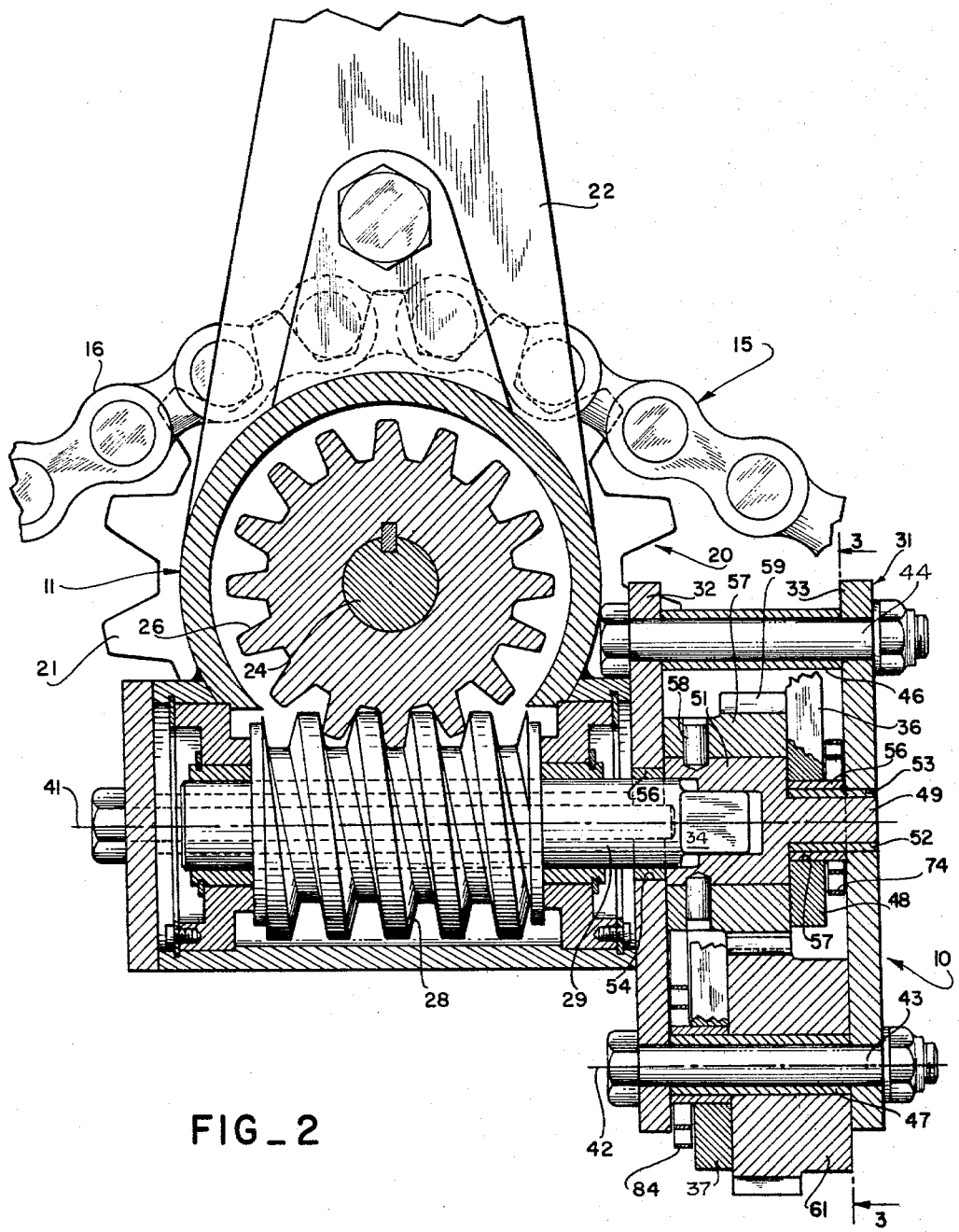
FIG_2

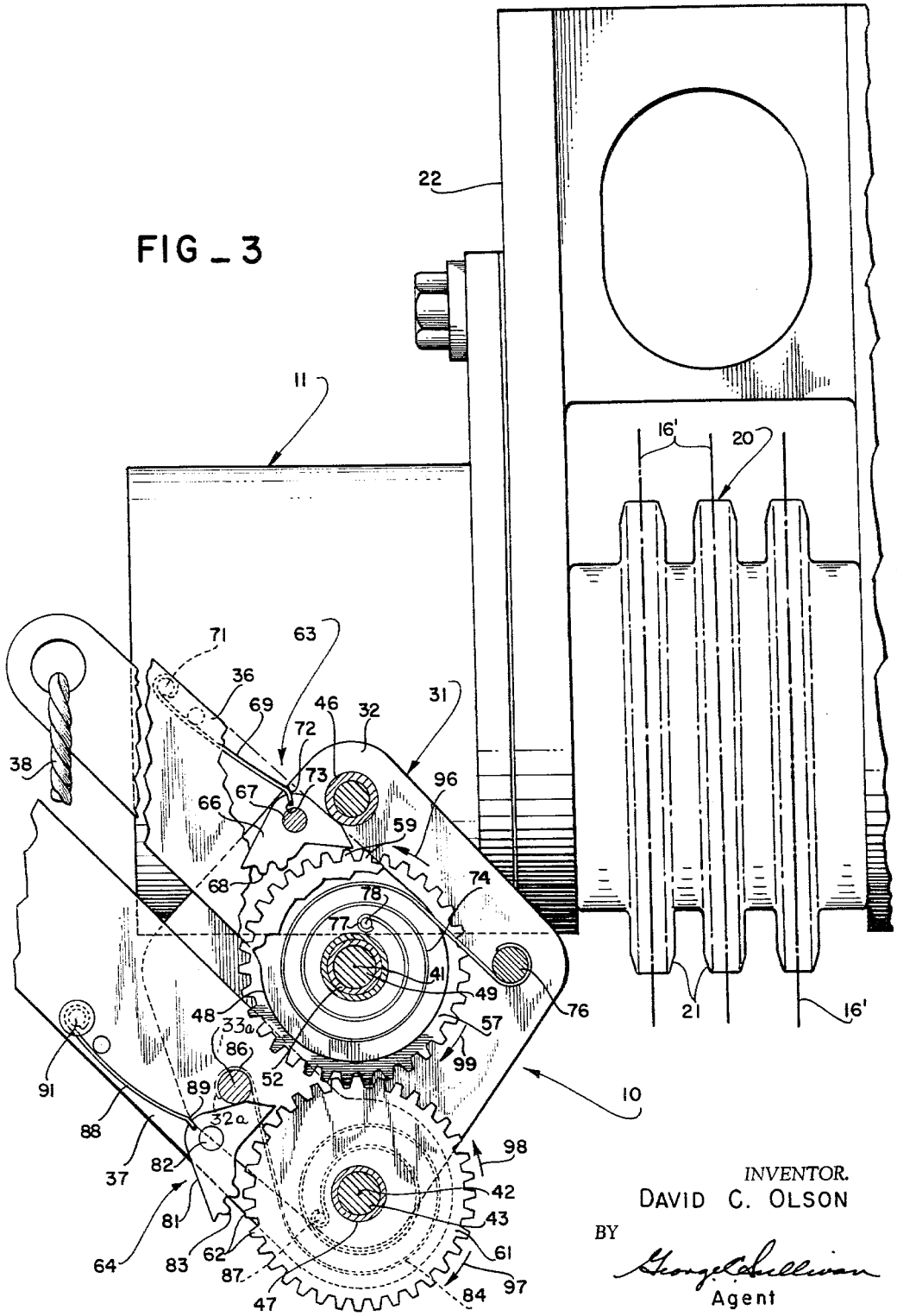

United States Patent Office 3,229,537
Patented Jan. 18, 1966

3,229,537
REMOTE CONTROL ACTUATOR DEVICE
David C. Olson, Burbank, Calif., assignor to Lockheed Aircraft Corporation, Burbank, Calif.
Filed June 22, 1962, Ser. No. 204,321
12 Claims. (Cl. 74—142)

This invention relates to load handling slings, and the like, and more particularly to a manual remote control for actuation of adjustment mechanisms used in connection with hoists for supporting bulky or heavy objects to be lifted whereby the center of gravity of the object may be adjusted for balancing the object relative to the hoist.

More specifically, this invention provides new and improved means for manual remote actuation of the rotatable actuator shaft of a load handling sling having rotatable gear means, an elongated bar, a hanger at each of opposite ends of the bar and adapted to be secured to the load for supporting the load, a chain enmeshed with a portion of the gear means and having opposite ends supporting the bar wherein rotation of the actuator shaft is translated into rotation of the gear means so as to move the chain for varying the center of gravity of the load handled by the bar.

In general, the improved means for remotely rotating the actuator shaft comprises a pair of rotatable gears secured to the gear means of the sling so that one of the gears is coactive with the actuator shaft to rotate the shaft in response to rotation thereof. A pair of elongated handles, each connected to one of the gears and having outer ends adapted to have ropes or other elongated pull members secured thereto, is provided for pivoting the handles from a remote position wherein pivoting of one of the handles is translated by pulling downwardly on its pull member from a remote position into a movement of the gear means in one direction to move the chain and therefore the bar, to adjust the center of gravity of the load in one direction and pivoting of the other handle is actuatable to adjust the center of gravity of the load in another direction.

Although this invention is shown and described as being applied to a load handling sling, it is to be understood that it is within the scope of this invention to apply the remote control for actuating other mechanisms, such as a power plant, or a sprocket gear for doing the actual hoisting by appropriate modification within the understanding of a skilled mechanic.

Although load handling slings have been provided in which the center gravity of the load handled by the sling may be adjusted by various means, such means have included wrenches, cranks, or other means for actuating the gear box of the sling operable at the gear box itself whereas remotely operated means have included pulley and cains which are relatively heavy, require impractically sized pulleys to reduce the operating power required to handle them and other means. The relatively heavy chain means frequently causes damage to the object being hoisted by beating thereof against the object and is also a hazard to operators of the hoist.

It is therefore an object of this invention to provide a new and improved manual remote actuator for a center of gravity changing gear box, or the like, which may be remotely controlled by a relatively soft and pliant pull member, such as rope, cable, or the like.

Another object of this invention is to provide a new and improved means for remotely actuating the actuator of the center of gravity changing gear box which can be manipulated to change the center of gravity in either direction relative to the center of the gear box of the sling.

Yet another object of this invention is to provide a new and improved actuator means which is relatively compact in its construction and is relatively economical to manufacture, and capable of mass production and interchangeability of parts thereof.

A general object of this invention is to provide new and improved remotely controllable means for actuating an actuator for a load handling sling, and the like, which overcomes disadvantages of prior means and methods heretofore employed to accomplish generally similar purposes.

These and other objects of this invention will be more apparent from the ensuing drawings, detailed description, and appended claims.

In the drawings:

FIGURE 1 is a perspective view, in elevation, of the remote control of this invention with parts thereof illustrated as being foreshortened for greater clarity;

FIGURE 2 is a side view, in elevation, thereof, with parts shown in cross-section for greater clarity;

FIGURE 3 is a vertical, cross-sectional view as taken substantially along the line 3—3 of FIGURE 2; and FIGURE 4 is a perspective view, in elevation, illustrating a handle thereof in greater detail.

Referring in detail to the drawings, there is shown by way of illustration, but not of limitation, a remote control actuator device designed and constructed in accordance with this invention and generally designated by the numeral 10. The device 10 is illustrated herein as being coactive with a gear box 11 forming a part of a sling 12 adapted for handling a load (not shown). The sling 12 includes an elongated bar 13 having hanger elements 14 pivotally secured to opposite ends thereof for supporting the load and the device 10 is operable for varying the center of gravity of the load suspended from the sling.

The sling 12 is suspended on a sprocket chain assembly 15, herein shown as comprising a plurality of sprocket chains 16 secured to the ends of the bar 13 at one end as by a clevis 17 and at its opposite end by a clevis 18. The sprocket chain assembly 15 has a portion intermediate of its ends extending over and enmeshed with an upper portion of each sprocket gear 21 of a set 20 of sprocket gears rotatably mounted relative to a hanger bracket 22 of the gear box 11 whereby the sling 12 may be suspended and handled by a hook 23 of a hoist (not shown). The sprocket chain assembly 15 is illustrated herein as including three chains having a common clevis at each end, although it is to be understood that any suitable number of chains may be utilized to support the bar 13 in movable relation to the gear box 11. The chains 16 are indicated in full lines in FIGURES 1 and 2 and by center lines 16' in FIGURE 3 for greater clarity.

The sprocket gear assembly 20 is keyed or otherwise secured to a transverse shaft 24 rotatably mounted in the bracket 22, the shaft 24 being common to the sprocket gear assembly 20 and a worm gear 26 so as to cause the gear assembly 20 to rotate in response to rotation of the worm gear. The sprocket gear assembly 20, in response, moves the sprocket chain assembly 15 so as to displace the center of gravity of the load suspended from the sling 12. The gear box 11 further includes a worm 28 mounted for rotation around an axis substantially normal to the axis of rotation of the gear means 20 and worm gear 26 so as to have teeth enmeshed with the teeth of the worm gear 26 so as to translate rotation of a shaft 29 coaxial with the axis of rotation of the worm 28 and integral therewith into a rotation of the shaft 24 to rotate the gear assembly 20 and move the sprocket chain assembly 15 in accordance with the direction of rotation of the shaft 29.

In accordance with this invention, the apparatus 10 includes a housing 31 comprising a pair of spaced, parallel plates 32 and 33 secured to the bracket 22 so as to support the rotating means 10 to be coactive with the actuator shaft 29. The shaft 29 includes an outwardly extending non-circular end 34 for rotating the shaft in response to pivotal movement of a pair of handles or arms 36 and 37. These handles are remotely operable by means of elongated pull members 38 and 39, respectively, secured to the outer end of the handles whereby pivotal movement of the handles in one direction, caused by pulling of the pull members in the one direction, is translated into a rotation of the shaft 29. This rotation is translated, as previously mentioned, into a rotation of the gear assembly 20 to move the sprocket chains 15 in a desired direction.

The handle 36 is mounted for pivotal movement about the axis 41 of rotation of the shaft 29 whereas the handle 37 is mounted for pivotal movement about the longitudinal axis 42 of a transverse fastener in spaced parallel relationship to the axis 41. The fastener is in the form of a bolt 43 secured transversely relative to the plates 32 and 33 so as to secure the plates together in spaced, parallel relationship. The plates 32 and 33 are retained in predetermined spaced relationship by spacers 46 and 47, respectively, as best seen in FIGURE 2, wherein spacers 46 and 47 are mounted on fasteners 44 and 42, respectively.

The handle 36 is journalled on the axis 41, at its end 48, around a reduced, cylindrical end 49 of a coupler 51, the reduced end 49 of the coupler being rotatable in a bushing 52, pressed or otherwise secured in a transverse bore 53 of the plate 33, the bore 53 being aligned with a transverse bore 54 of the plate 32. The bore 54 is provided with a bushing 56, pressed or otherwise secured therein, for journalling the outer end of the shaft 29 for rotation on the axis 41. A gear 57 is keyed, or otherwise secured, to an enlarged portion of the coupler 51, as by a pin 58, or the like, so that the gear is rotatable together with the coupling 51 and shaft 29 and includes peripheral gear teeth 29 enmeshed with a second gear 61 rotatable on the spacer 47 of the bolt 43.

Pawl means are provided on each handle 36 and 37 and coactive with the gears 57 and 61 for translating pivotal movement of the handles in one direction into a rotation of the gears in opposed directions so as to intermittently rotate the actuator shaft 29 in one direction. The pawl means for the handle 36 is generally designated by the numeral 63 and the pawl means for the handle 37 is generally designated by the numeral 64.

The pawl means 63 includes a pawl 66 pivotally mounted on a pin 67 extending transversely from the plate 33. A segmental gear 68 selectively engageable with the gear teeth 59 of the gear 57 is also included so that when the handle 36 is pivoted downwardly, by pulling on the pull rope or cable 38, and around the axis 41, the pawl revolves about the axis 41 until its teeth 68 engage the teeth 59 to rotate the gear 57. The pawl 66 has its teeth 68 normally biased into engagement with the teeth 59 by a spring 69 secured at 71 to the handle 36 and its outer free end 72 engaging a detent 73 of the pawl 66 so as to bias the pawl 66 into such engagement. Therefore, when the handle 36 is pulled downwardly, the teeth 68 engage the teeth 59 of the gear 57 after which continued pivoting of the handle 36 causes the gear 57 to rotate counterclockwise, as viewed in FIGURE 3, at the same time winding up a torque spring 74 normally acting to bias the arm 36 upwardly. The spring 74 has one end contacting another mounting bolt 76 connecting the plates 32 and 33 and an opposite end 77 secured to a cross pin 78 secured to the handle 36. In this manner, when the arm 36 is pivoted downwardly to rotate the gear 57 the spring 74 is wound and when the pull member 38 is released, the torque spring 74 acts to pivot the arm 36 upwardly to bring the pawl 66 into engagement with the spacer 46 so as to disengage the teeth 68 from the teeth 59 whereupon the teeth 68 escape the teeth 59 to allow rotation of the gear 57 in a reverse direction.

The pawl means 64 is coactive with the arm 37 to rotate the gear 61 in a counterclockwise direction and includes a pawl 81 pivotally mounted on a pin 82 extending transversely outwardly of the arm 37. The pawl includes segmental gear teeth 83 engageable with gear teeth 62 of the gear 61 in response to pivotal movement of the arm 37 downwardly, further responsive to a downward pull of the pull member 39 on the outer end thereof. The counterclockwise rotation of the gear 61 is translated into a clockwise rotation of the gear 57, being enmeshed therewith, to rotate the shaft 29 in a clockwise direction around the axis 41. The rotation of the handle 37 is also transmitted to a torque spring 84 for winding the spring which has one end 86 secured to a pin 32a extending from an inner side of the plate 32 (positioned exactly behind the pin 33a in FIGURE 3) and an opposite end secured to a pin 87 secured to the handle 37 so as to normally bias the handle 37 in a clockwise direction. A leaf spring 88 has an outer end 89 normally biasing the teeth 83 of the pawl 81 into engagement with the gear teeth 62. The spring 88 has its opposite end secured in a pin 91 which is, in turn, transversely secured to the arm 37. Disengagement of the pawl 81 from the gear 61 is caused by engagement of a pin 33a attached to the plate 33 and extending inward toward the handle 37, as seen in FIGURES 1 and 3.

In accordance with the foregoing description, the apparatus 10 operates in the following manner:

The load is secured to the hangers 14 so as to be suspended from the bar 13 of the sling 12, a transverse bar being preferably provided with similar hangers at its outer ends (not shown) for securing the load in a manner to avoid transverse swing and sway of the load relative to the bar 13. In accordance with this invention, the center of gravity of the load may be adjusted by pulling on one of the pull members 38 or 39 to pivot the arms 36 or 37, respectively, to actuate the means 10 to rotate the actuator shaft 29. In response to pulling of the member 38, the arm 36 is pivoted downwardly to engage the teeth 68 of the pawl 66 with the teeth 59 of the gear 57 to rotate the gear 57 counterclockwise, as indicated by the arrowed line 96, whereby the gear 61 enmeshed therewith is rotated in a clockwise direction, as indicated by the arrowed line 97, and the spring 74 is wound to build up a torque force therein. During the pivotal movement of the arm 36, the gear 61 is clear of the teeth 83 of the pawl 81 so that the arm 37 does not pivot. As the gear 57 is rotated, the actuator shaft 29 is rotated therewith to rotate the worm 28 and the rotation of the worm 28 is ranslated into a rotation of the worm gear 26 which is keyed to the shaft 24 to rotate the sprocket gear assembly 20 to move the sprocket chain assembly 15 in one direction to adjust the center of gravity of the load carried by the bar 12.

Conversely, when the pull member 39 is pulled downwardly, the arm 37 is pivoted downwardly whereby the pawl 81 of the ascapement member 64 engages its teeth 83 with the teeth 62 of the gear 61 to rotate the gear 61 in a counterclockwise direction, as indicated by the arrowed line 98, and to cause the spring 84 to be wound. In response, the gear 57 is rotated in a clockwise direction, indicated by the arrowed line 99, and the actuator shaft 29 is rotated in a likewise direction to rotate the worm 28 and the worm gear 26 whereby the sprocket gear assembly 20 is rotated in an opposite direction to move the sprocket chain assembly 15 to shift the center of gravity of the load in an opposite direction. In this manner, by selectively pulling one of the pull members 38 or 39, the center of gravity of the load is shifted in one direction or the other until the weight of the load is balanced relative to the hoist member supporting the gear block.

While there is herein shown and described what is conceived to be the most practical and preferred embodiment of this invention, it is recognized that departures may be made therefrom within the scope of this invention which is not limited to the details disclosed herein but is to be accorded the full scope of the claims so as to embrace any and all equivalent devices.

What is claimed as new and desired to secure by Letters Patent is:

1. A means for rotating an actuator shaft of a load handling sling, and the like, comprising:
   (a) a housing;
   (b) a first gear rotatably mounted in said housing;
   (c) connector means rotatable with said first gear and adapted to be connected to the actuator shaft for translating rotation of said first gear into a first rotational direction rotation thereof;
   (d) a second gear rotatably mounted on said housing and having its teeth enmeshed with the teeth of said first gear so as to cause said first gear to rotate in a direction opposite said first in response to rotation of said second gear in said first direction;
   (e) a first handle pivotally mounted on said housing adjacent to said first gear;
   (f) a second handle pivotally mounted on said housing in spaced relationship to said first handle and adjacent to said second gear; and
   (g) first pawl means operatively connected to said first handle and engageable with said first gear responsive to downward movement of said first handle to rotate said first gear in said first direction; and
   (h) second pawl means operatively connected to said second handle and engageable with said second gear responsive to downward movement of said second handle to rotate said second gear in said first direction and said first gear in the opposite direction whereby the actuator shaft is caused to rotate in either alternative direction responsive to downward movement of a selected one of said handles.

2. A rotating means as defined in claim 1, including spring means having one end secured to said housing and an opposite end secured to one of said pair of handles so as to bias said one handle to a return position following its actuation.

3. A rotating means as defined in claim 1, including spring means associated with each of said handles, each having one end secured to said housing and an opposite end secured to one of said handles for biasing said one handle to rotate in a direction opposite that caused by its actuation.

4. A rotating means as defined in claim 1, wherein each of said handles is mounted for pivotal movement about the axis of rotation of its associated gear.

5. A rotating means as defined in claim 1, wherein each of said pawl means includes:
   (a) a pawl pivotally mounted on its handle around an axis spaced from said axis of rotation of its associated gear so as to be engageable with the teeth of its associated gear in response to pivotal movement of said handle in one direction for rotating said associated gear;
   (b) stop means mounted adjacent said handle and positioned to be engaged by said pawl when said handle is in its normal position; and
   (c) spring means normally biasing said pawl into engagement with the teeth of its associated gear and out of abutment with said stop means, said pawl being disengaged from said gear teeth in response to engagement of said stop means by said pawl when said handle is pivoted in an opposite direction.

6. A rotating means as defined in claim 4, wherein said handles are pivotable in parallel planes spaced axially in reference to their axes of rotation.

7. An actuator device comprising:
   (a) a housing;
   (b) a pair of gears mounted for rotation in said housing and mutually engaged for rotation in opposite directions, at least one of said gears adapted to provide a rotational power output;
   (c) a pair of handles respectively pivotally mounted adjacent said gears;
   (d) separate pawl means operatively coactive between each said handle and its adjacent gear so as to cause rotation of said adjacent gear in one direction in response to pivotal movement of the associated said handle and rotation of the other said gear in an opposite direction independent of its adjacent said handle;
   (e) said rotational power output acting in a selected one of said directions responsive to actuation of a selected one of said handles.

8. The actuator device of claim 7 including:
   (a) an actuator shaft mounted for rotation in said housing and adapted to be driven by one of said gears;
   (b) a worm gear mounted for rotation upon said actuator shaft;
   (c) separate rotatable gear means engaged with and rotatable by said worm gear means; and
   (d) a sprocket attached to said gear means for rotation therewith, said sprocket being engageable with a chain for selectively driving the same in either of two opposite directions.

9. The actuator device of claim 7 including spring means secured adjacent each of said handles and coactive therewith for normally biasing its associated handle means to rotate in a predetermined direction.

10. The actuator device of claim 7 including a separate spring biased pawl pivotally mounted on each of said handles, each said pawl being coactive between a handle and its associated gear for translating pivotal movement of a handle in one direction into a rotation of its associated gear in the said one direction.

11. An actuator device comprising:
    (a) a housing;
    (b) an actuator shaft mounted for rotation in said housing;
    (c) a pair of gears rotatably mounted in said housing, mutually engaged for rotation in opposite directions, and adapted to rotate said actuator shaft;
    (d) a pair of elongated arms, each pivotally secured at one of its ends adjacent to one of said gears and having an outer end adapted to be secured to an elongated pull member for pivoting said arms in one direction in response to pulling thereof in the said one direction; and
    (e) pawl means operatively associated with each of said handles and its associated gear for rotating said associated gear in response to a downwardly pull on said arms so as to rotate one of said pair of gears and said actuator shaft in said one direction when one said arm is pulled and in an opposite direction when said other arm is pulled.

12. An actuator device for varying the center of gravity of a load-handling sling comprising:
    (a) a housing;
    (b) an actuator shaft mounted for rotation in said housing;
    (c) output gear means driven by said shaft;
    (d) means upon said output gear means for engaging a chain of a load-handling sling and selectively driving the same in either of two alternative directions;
    (e) a pair of gears mounted in said housing, said gears being mutually engaged and rotatable in opposite directions and adapted to rotate said shaft;
    (f) a pair of handles respectively pivotally mounted adjacent said gears;
    (g) separate pawl means operatively coactive between each said handle and its adjacent gear so as to cause rotation of said adjacent gear in one direction in response to pivotal movement of the associated said handle and rotation of the other said gear in an opposite direction independent of its adjacent said handle;

(h) spring means secured adjacent each of said handles and coactive therewith for normally biasing its associated handle means to rotate in a predetermined direction; and (i) a spring biased pawl pivotally mounted on each of said handles and coactive between a handle and its associated gear for translating pivotal movement of a handle in one direction into a rotation of its associated gear in the same direction;

(j) said output gear means rotating in a selected direction when one of said handles is pivoted about its axis and in an opposite direction when the other of said handles is pivoted about its axis in the same direction as said one handle is pivoted.

References Cited by the Examiner

UNITED STATES PATENTS

| | | | |
|---|---|---|---|
| 299,085 | 5/1884 | Nixon | 74—143 |
| 1,590,300 | 6/1926 | Linaker et al. | 74—157 X |
| 1,663,851 | 3/1928 | Linaker | 74—142 X |
| 1,975,528 | 10/1934 | Anderson. | |
| 2,217,453 | 10/1940 | Pennell | 74—505 X |
| 2,512,450 | 6/1950 | Williams | 74—142 |
| 2,596,502 | 5/1952 | Moore | 294—74 |
| 2,629,625 | 2/1953 | Phillips | 294—74 |

BROUGHTON G. DURHAM, *Primary Examiner.*

ANDRES H. NIELSON, *Examiner.*